US009625274B2

(12) United States Patent
Burns et al.

(10) Patent No.: US 9,625,274 B2
(45) Date of Patent: Apr. 18, 2017

(54) TIME-VARYING EXTREMUM SEEKING FOR CONTROLLING VAPOR COMPRESSION SYSTEMS

(71) Applicant: Mitsubishi Electric Research Laboratories, Inc., Cambridge, MA (US)

(72) Inventors: Daniel Burns, Wakefield, MA (US); Martin Guay, Kingston (CA); Walter Weiss, Kingston (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 433 days.

(21) Appl. No.: 14/228,632

(22) Filed: Mar. 28, 2014

(65) Prior Publication Data

US 2015/0277444 A1 Oct. 1, 2015

(51) Int. Cl.
G05D 11/00 (2006.01)
G01D 3/028 (2006.01)
G05D 7/06 (2006.01)
G05B 15/02 (2006.01)
G06F 11/07 (2006.01)
(Continued)

(52) U.S. Cl.
CPC ............ *G01D 3/028* (2013.01); *F24F 11/001* (2013.01); *F25B 49/02* (2013.01); *G05B 15/02* (2013.01); *G05D 7/0629* (2013.01); *G06F 11/079* (2013.01)

(58) Field of Classification Search
CPC ........ F24F 11/006; F24F 11/001; F25B 49/02; F01L 9/04; G05B 17/02; G05D 11/00; G01D 3/028
See application file for complete search history.

(56) References Cited

U.S. PATENT DOCUMENTS 5,735,134 A * 4/1998 Liu .................. F25B 49/02
62/183
8,694,131 B2 4/2014 Burns et al.
(Continued)

FOREIGN PATENT DOCUMENTS

WO 2009012282 A3 1/2009

OTHER PUBLICATIONS

Burns Laughman, "Extremum Seeking Control for Energy Optimization of Vapor Compression System" Jul. 2012, pp. 1-7 <ExtreM_Seek12.pdf>.*

*Primary Examiner* — Tuan Vu
(74) *Attorney, Agent, or Firm* — Gene Vinokur; James McAleenan; Hironori Tsukamoto

(57) ABSTRACT

A method for controlling a vapor compression system determines a value of a metric of performance of the vapor compression system using a previous value of an estimated parameter and a previous value of a control signal determined for a previous time step of the control. The values of the estimated parameter represent a relationship between values of the control signal and values of the metric of performance. A current value of the estimated parameter is determined based on the previous value of the estimated parameter and an error between the determined value of the metric of performance and a measured value of the metric of performance. Next, a current value of the control signal is determined based on the current value of the estimated parameter.

17 Claims, 9 Drawing Sheets

(51) Int. Cl.
*F24F 11/00* (2006.01)
*F25B 49/02* (2006.01)

(56) References Cited

U.S. PATENT DOCUMENTS

| | | | |
|---|---|---|---|
| 2004/0083993 A1* | 5/2004 | Seale | F01L 9/04 |
| | | | 123/90.11 |
| 2008/0179408 A1 | 7/2008 | Seem | |
| 2010/0106331 A1* | 4/2010 | Li | F24F 11/006 |
| | | | 700/277 |
| 2011/0167025 A1* | 7/2011 | Danai | G05B 17/02 |
| | | | 706/12 |
| 2011/0276182 A1 | 11/2011 | Seem et al. | |
| 2014/0214214 A1* | 7/2014 | Asmus | F24F 11/001 |
| | | | 700/276 |

* cited by examiner

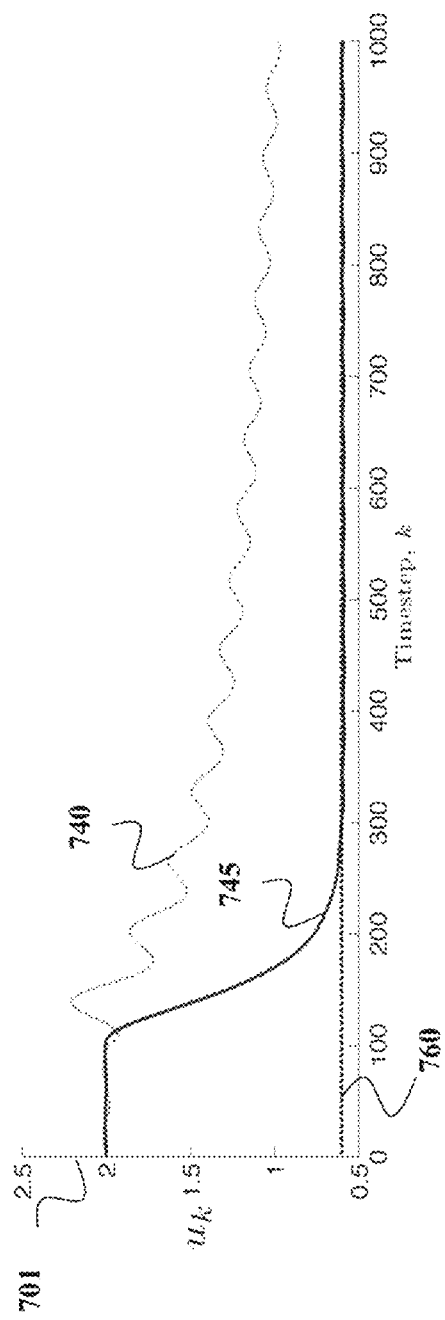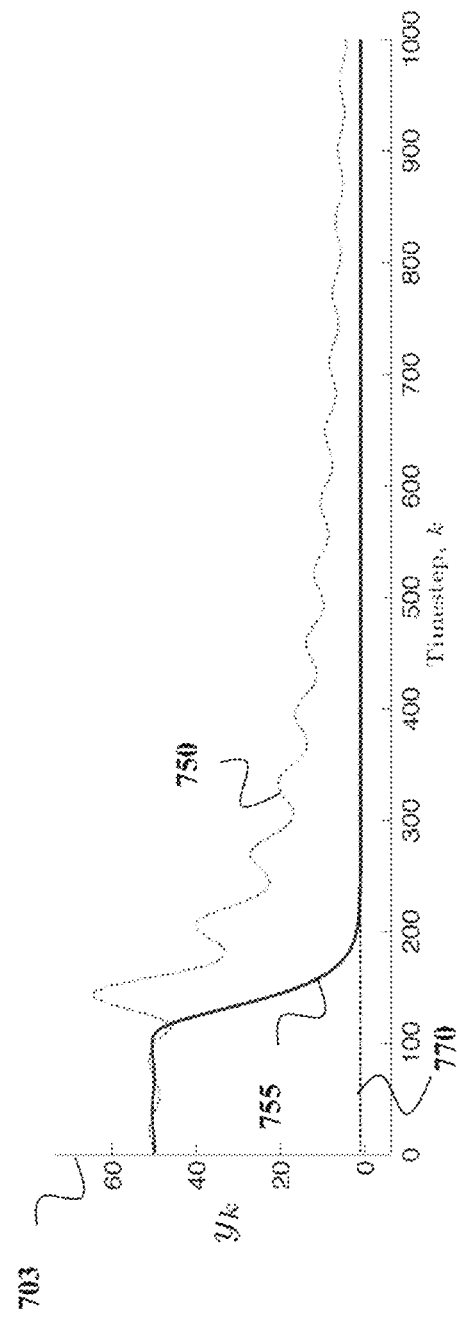
FIG. 7B
FIG. 7C

TIME-VARYING EXTREMUM SEEKING FOR CONTROLLING VAPOR COMPRESSION SYSTEMS

FIELD OF THE INVENTION

This invention pertains to the field of controls for vapor compression systems, and more particularly, to control methods for optimizing a performance metric of the vapor compression systems.

BACKGROUND OF THE INVENTION

Vapor compression systems, such as heat pumps, refrigeration and air-conditioning systems, are widely used in industrial and residential applications. The introduction of variable speed compressors, variable position valves, and variable speed fans for the vapor compression cycle has greatly improved the flexibility of the operation of such systems. It is possible to improve the efficiency of vapor compression systems by controlling these new components correctly.

For example, a speed of the compressor can be adjusted to modulate a flow rate of a refrigerant. The speed of an evaporator fan and a condenser fan can be varied to alter heat transfer between air and heat exchangers. The change in an expansion valve opening can directly influence a pressure drop between a high-pressure and a low-pressure in the vapor compression system, which, in turn, affects the flow rate of the refrigerant as well as superheat temperature at the corresponding evaporator outlet.

A combination of commanded inputs to the vapor compression system that delivers a particular amount of heat is often not unique and these various combinations consume different amounts of energy. Therefore, it is desirable to operate the vapor compression system using the combination of inputs that minimizes energy and maximizes efficiency of the system.

Conventionally, methods maximizing the energy efficiency rely on the use of mathematical models of the physics of vapor compression systems. Those model-based methods attempt to describe the influence of commanded inputs of the components of the vapor compression system on the thermodynamic behavior of the system and the consumed energy. In those methods, models are used to predict the combination of inputs that both meets the heat load requirements and minimizes energy.

However, the use of mathematical models for the selection of optimizing inputs has several important drawbacks. Firstly, models rely on simplifying assumptions in order to produce a mathematically tractable representation. These assumptions often ignore important effects or do not consider installation-specific characteristics such as room size, causing the model of the system to deviate from actual behavior of the system.

Secondly, the variation in those systems during the manufacturing process are often so large as to produce vapor compression systems of the same type that exhibit different input-output characteristics, and therefore a single model cannot accurately describe the variations among copies produced as the outcome of a manufacturing process.

Thirdly, those models are difficult to derive and calibrate. For example, parameters that describe the operation of a component of a vapor compression system, e.g., a compressor, are experimentally determined for each type of the compressor used, and a model of a complete vapor compression system may have dozens of such parameters. Determining the values of these parameters for each model is an extensive effort. Also, vapor compression systems are known to vary over time. A model that accurately describes the operation of a vapor compression system at one time may not be accurate at a later time as the system changes, for example, due to slowly leaking refrigerant, or the accumulation of corrosion on the heat exchangers.

An alternative to the model-based controllers optimizing a metric of performance includes "extremum-seeking" controllers (ESC) due to their ability to maximize or minimize a signal of interest. Conventional ESC actively experiment with the device under control by applying a perturbation to one or more inputs, and measuring the resulting perturbations in the performance metric. These perturbations are averaged over some time window to produce an estimate of the gradient of the performance metric. This local estimate of the gradient is then used to steer the average value of the inputs in the direction of the gradient that maximizes or minimizes the cost.

For example, the method described in U.S. Pat. No. 8,694,131 teaches that a perturbation-based extremum seeking controller can be configured to modify the operation of a vapor compression system such that energy-optimal combinations of actuators are used to direct the operation of vapor compression systems. While the perturbation-based extremum seeking method can achieve the optimum of a convex performance metric without relying on a model, that method suffers from slow convergence rates. Because the objective of ESC is to find an optimal steady state operating point, the extremum seeking controller controls the plant in a quasi-steady manner, i.e., without exciting the plant's dynamic response. Otherwise, phase information between the applied controls and measurements due to the transient response cannot be distinguished from the phase information due to the sinusoidally perturbed measurement of the performance metric.

If the slowest, and therefore dominant, time constant associated with the natural dynamics of the vapor compression system is called $\tau_{plant}$, then the perturbation period $\tau_{perturb}$ must be much slower (larger time constant): $\tau_{perturb} \gg \tau_{plant}$. Further, the ESC must average several perturbations in order to obtain an accurate estimate of the (average) gradient, and since the extremum seeking occurs on the timescale of this averaged gradient, the convergence rate of the extremum seeking controller is two time scales slower than the plant dynamics:

$$\tau_{adapt} \gg \tau_{perturb} \gg \tau_{plant}$$

Because the dominant time constant of the vapor compression system is often on the order of tens of minutes, the extremum seeking controller can take several hours to converge to the optimum point. And since the disturbances acting on the vapor compression system are known to have faster dynamics, the optimal operating point can change before the perturbation ESC converges. As a result, the slow convergence property of perturbation-based extremum seeking represents a barrier to the solution of real time optimization of the performance of vapor compression systems.

Researchers have struggled with the slow convergence rates of perturbation-based ESC for some time. Initial efforts focused on introducing filters that separated the effect of the phase of the transient part of the response from the response to the perturbation. However, that method requires that the filters be designed with specific and detailed knowledge of the plant, and even when this information is available, the convergence rate is only marginally improved because the perturbation averaging is still required.

Others method have considered estimating the gradient of the performance metric, and a Hessian matrix. However, because the value of the Hessian matrix quickly approaches zero as the optimum point is approached, that method quickly becomes overwhelmed with noise.

Accordingly, there is a need in the art to improve the rate of convergence of the extremum seeking controllers.

SUMMARY OF THE INVENTION

One object of some embodiments of the invention is to improve a rate of convergence of extremum-seeking control methods that maximize or minimize a signal representing a metric of performance of vapor compression systems. Optimizing the metric of performance requires an estimate of a parameter representing a relationship between values of the control signal and values of the metric of performance. An example of such a parameter includes a gradient (slope) of the metric of performance with respect to the control signal. Some embodiment of the invention are based on a realization that such parameters should not be estimated exactly for each time step of the control, but can be approximated as long as the estimation converges to the true value of the parameter during the transient time of the control.

Such realization allows taking advantage of the iterative nature of the extremum seeking control to update the parameter recursively and concurrently with the determination of the control signal. For example, a current value of the estimated parameter can be determined based on the previous value of the estimated parameter and an error between the determined value of the metric of performance and a measured value of the metric of performance. In this way, the estimated parameter, e.g., the gradient, is guaranteed to converge to the true gradient regardless of noise.

Some embodiments of the invention are based on a realization that as the optimum value of a convex relationship is approached, the gradient of that relationship can be represented by time-varying parameter. It is further realized that an estimation algorithm can be formulated to estimate this time-varying gradient, and this estimated gradient can be used to calculate control actions that drive the system toward the optimal operating point. It is further realized that when formulated as a time-varying estimation problem, the need to average the estimated gradients is eliminated, which results in faster convergence rates.

Some embodiments of the invention are based on the realization that the convex relationship between vapor compression system inputs and a performance metric can be approximated by a function that uses the same inputs applied to the vapor compression system to generate estimated system outputs based on an estimated gradient. Some embodiments modify the estimated gradient in this function so that the estimated performance metric matches the measured performance metric and the estimated gradient has been driven to the actual gradient. A control law is determined using the estimated gradient in order to drive the system to the optimal point, and as the system moves from a suboptimal point to the optimal point, the value of the estimated gradient tracks the time-varying actual gradient as it approaches zero.

In various embodiments, the control signals can be a vector and the coefficients may be scalars, vectors or matrices of suitable dimension to ensure the multi-dimensional calculations are conformable. In this manner, some embodiments can simultaneously optimize a multiplicity of vapor compression system actuators.

Some embodiments of the invention are applied to optimization of vapor compression systems in uncertain customer environments, because disturbances such as changes in outdoor air temperature and heat load can be rejected without interfering with this extremum seeking controller.

Some embodiments of the invention can be applied to optimize one or more actuator commands directly (i.e., some actuators are directly steered by the extremum seeking controller), or by modifying one or more actuator commands that originate from a feedback controller. In the latter configuration, all actuator commands achieve their optimum values despite that only a subset of actuators are directly manipulated by the extremum seeking controller. This is because the vapor compression system is in feedback with a multivariable feedback controller that simultaneously controls all inputs to reject disturbances, including a disturbance that can be viewed as originating from the extremum seeking controller.

One embodiment of the invention reduces the energy consumption, in which case the performance metric can be the measured or estimated energy consumption of the vapor compression machine.

Another embodiment of the invention increases the heating or cooling capacity of the vapor compression system, for example, to achieve a change in setpoint temperature in a minimum amount of time. In this case, the performance metric can be measured or estimated cooling or heating capacity.

Another embodiment of the invention increases the coefficient of performance (COP), e.g., defined as the amount of heating or cooling provided by the vapor compression system normalized by the energy consumption. In this embodiment, the performance metric may be the energy consumption described divided by the heating or cooling capacity.

Accordingly, one embodiment of the invention discloses a method for controlling a vapor compression system. The method, at a current time step of a control, includes determining a value of a metric of performance of the vapor compression system using a previous value of an estimated parameter and a previous value of a control signal determined for a previous time step of the control, wherein values of the estimated parameter represent a relationship between values of the control signal and values of the metric of performance; determining a current value of the estimated parameter based on the previous value of the estimated parameter and an error between the determined value of the metric of performance and a measured value of the metric of performance; and determining a current value of the control signal based on the current value of the estimated parameter. The steps are performed by a processor.

Another embodiment discloses an extremum seeking controller for controlling a vapor compression system, including an estimator for determining an error between determined and measured metric of performance, and for estimating a parameter representing a relationship between values of control signal and values of the metric of performance, wherein the parameter is determined to reduce the error; and a control law unit for determining a control signal based on the estimated parameter.

DEFINITIONS

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" refers to a device or a set of devices to manage, command, direct or regulate the behavior of other devices or systems. The control system can be implemented by either software or hardware, and can include one or several modules.

A "computer system" refers to a system having a computer, where the computer comprises computer-readable medium embodying software to operate the computer.

A "network" refers to a number of computers and associated devices that are connected by communication facilities. A network involves permanent connections such as cables, temporary connections such as those made through telephone or other communication links, and/or wireless connections. Examples of a network include an internet, such as the Internet; an intranet; a local area network (LAN); a wide area network (WAN); and a combination of networks, such as an internet and an intranet.

A "vapor compression system" refers to a system that uses the vapor compression cycle to move refrigerant through components of the system based on principles of thermodynamics, fluid mechanics, and/or heat transfer.

An "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "setpoint" refers to a target value the system, such as the vapor compression system, aims to reach and maintain as a result of the operation. The term setpoint is applied to any particular value of a specific set of control signals and thermodynamic and environmental parameters.

"Measured outputs" refers to signals that can be measured using sensors in the machine (e.g., room air temperature).

"Control inputs" refers to signals that can be manipulated by the controller (e.g., compressor frequency).

A "performance metric" refers to a signal that is to be optimized. The performance metric may be measured or estimated.

BRIEF DESCRIPTIONS OF THE DRAWINGS

FIGS. 7B and 7C are graphs representing a comparison of the performance of the controller of FIG. 7A.

DETAILED DESCRIPTION OF THE EMBODIMENTS OF THE INVENTION

Figure 1:
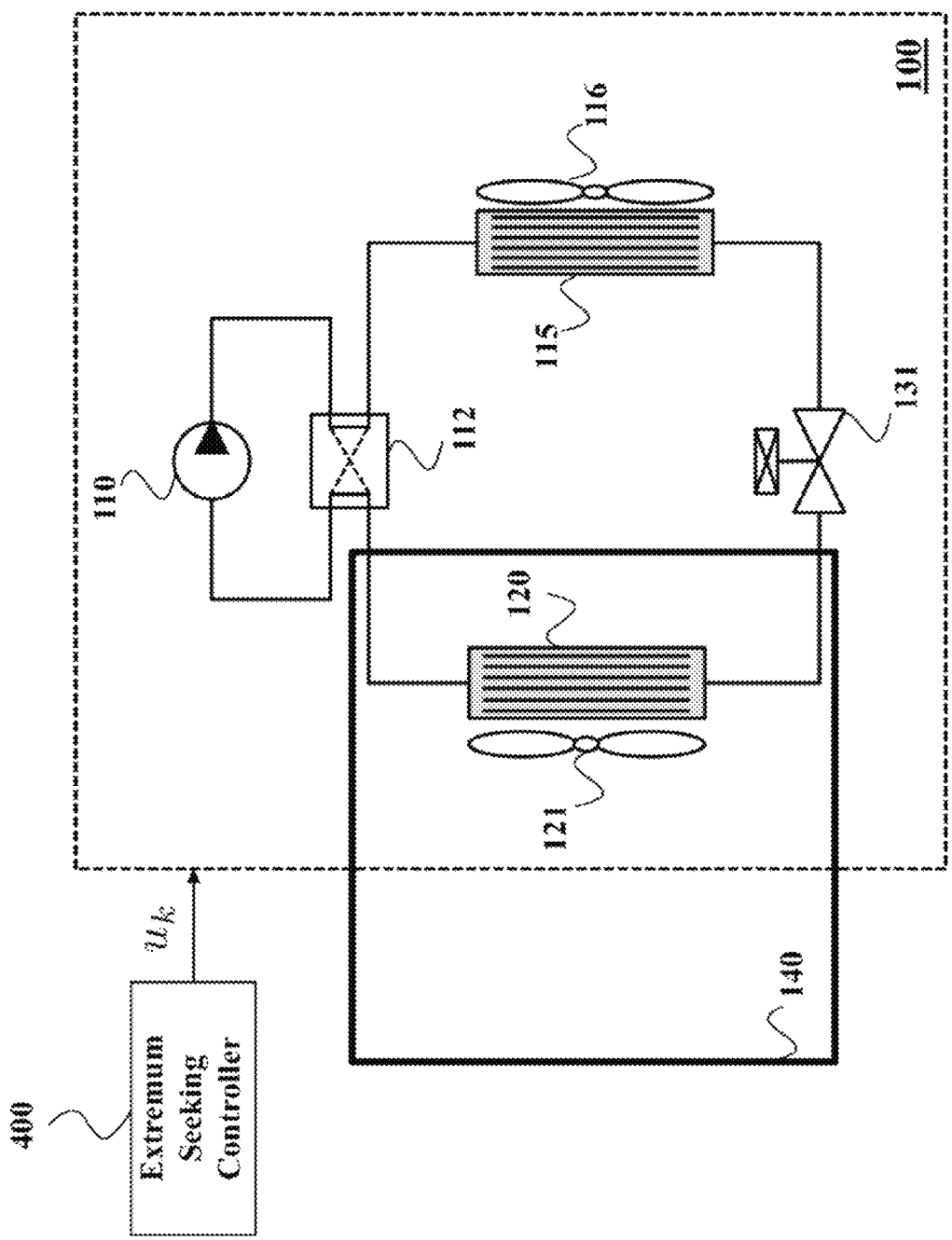
FIG. 1 is a diagram of a components and piping arrangement of a vapor compression system controlled by an extremum seeking controller (ESC) according to some embodiments of the invention.

FIG. 1 shows components and a piping arrangement of a vapor compression system 100 controlled by an extremum seeking controller (ESC) according to some embodiments of the invention. The vapor compression system 100 includes components, e.g., variable setting actuators. The components can include an indoor unit heat exchanger 120 located in an indoor space or zone 140, an outdoor unit heat exchanger 115 located in the ambient environment, a compressor 110 and an expansion valve 131. Additionally, the system 100 can include a flow reversing valve 112 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor.

In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 2:
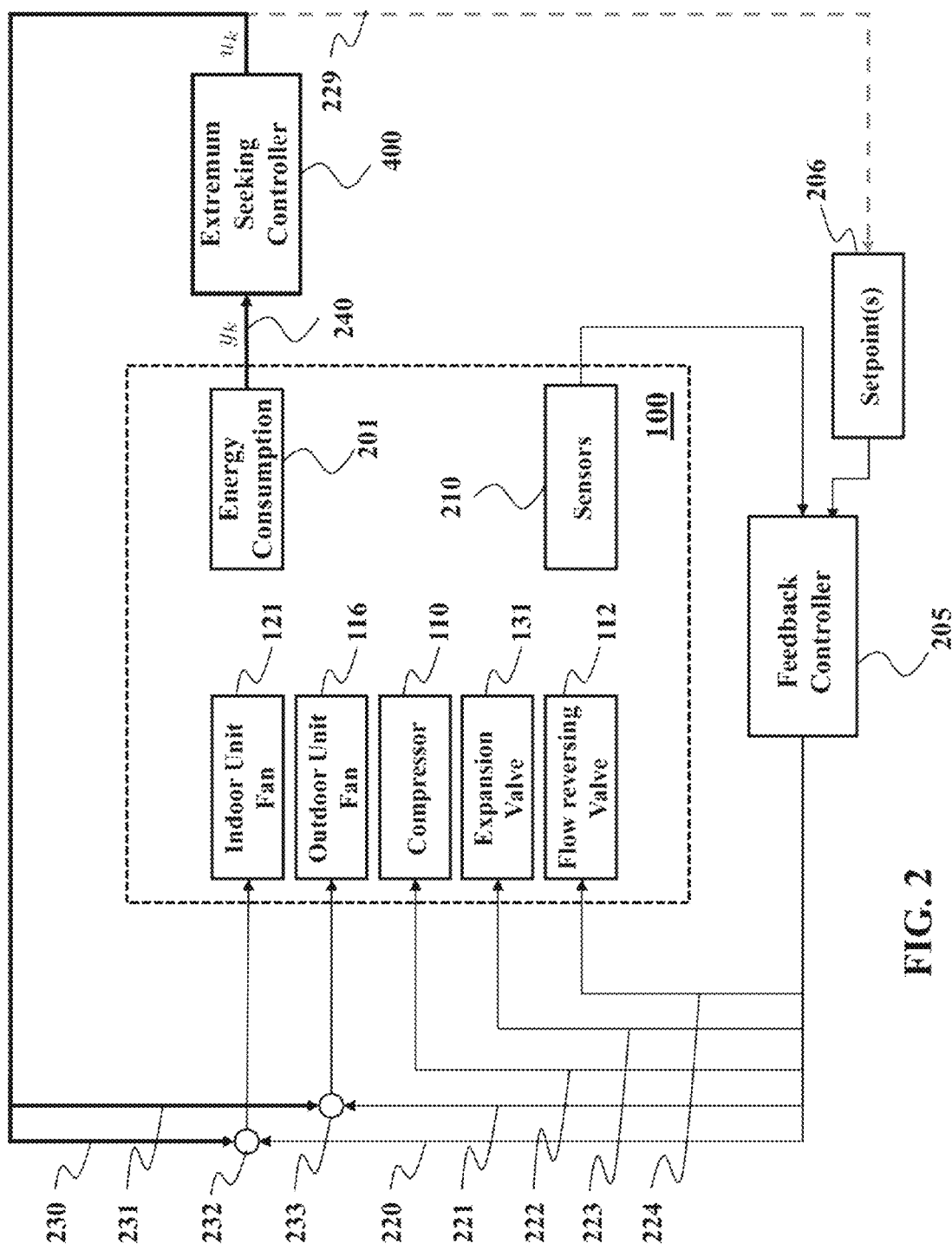
FIG. 2 is a diagram of components and configurations of signals, sensors and controllers used in a vapor compression system of some embodiments.

FIG. 2 shows components and a configuration of signals, sensors and controllers used in a vapor compression system of some embodiments. Typically, a feedback controller 205 reads information from sensors 210 configured to measure various temperatures, pressures, flow rates or other information about the operation of the system. Additionally, the feedback controller may be provided with setpoints 206 which represent desired values of measured or estimated signals of the process such as a desired zone temperature or a desired evaporator superheat temperature. Setpoint information may come from a thermostat, wireless remote control, or internal memory or storage media. The feedback controller then computes actuator commands such that some measured values are driven to their setpoints. These actuator commands can include an indoor unit fan speed command 220, an outdoor unit fan speed command 221, a compressor rotational speed 222, an expansion valve position 223, and a flow reversing valve position 224. In this manner, the controller controls operation of the vapor compression system such that the setpoint values are achieved for a given heat load.

It has been shown that the increased number of variable actuators has provided an additional degree of flexibility to the operation of the vapor compression system. This additional flexibility has been exploited to select combinations of actuator commands that satisfy the setpoints and also minimize energy consumption. Additionally, the setpoints themselves may be viewed as a degree of flexibility to the operation of the vapor compression system that may be exploited to minimize energy consumption.

The extremum seeking controller 400 is configured to accept measurements or estimates 240 of the energy consumption 201 of the vapor compression system, and provide modifications 230, 231 to one or more of the actuator commands provided by the feedback controller or provide modifications 229 to one or more of the setpoint values 206. Optimizing the performance metric requires an estimate of a parameter representing a relationship between values of the control signal and values of the metric of performance.

Some embodiments of the invention may optimize a performance metric by selecting setpoints instead of directly manipulating actuators. Typically, a feedback controller for vapor compression systems is designed to regulate measured signals to setpoints. Setpoints may be external to the vapor compression system such as desired room temperature, or they may be internal such as a desired compressor discharge temperature or a desired evaporator superheat temperature. If there exists a convex relationship between a setpoint and a performance metric, some embodiments of the invention automatically select setpoints that optimize a performance metric.

Figure 3:
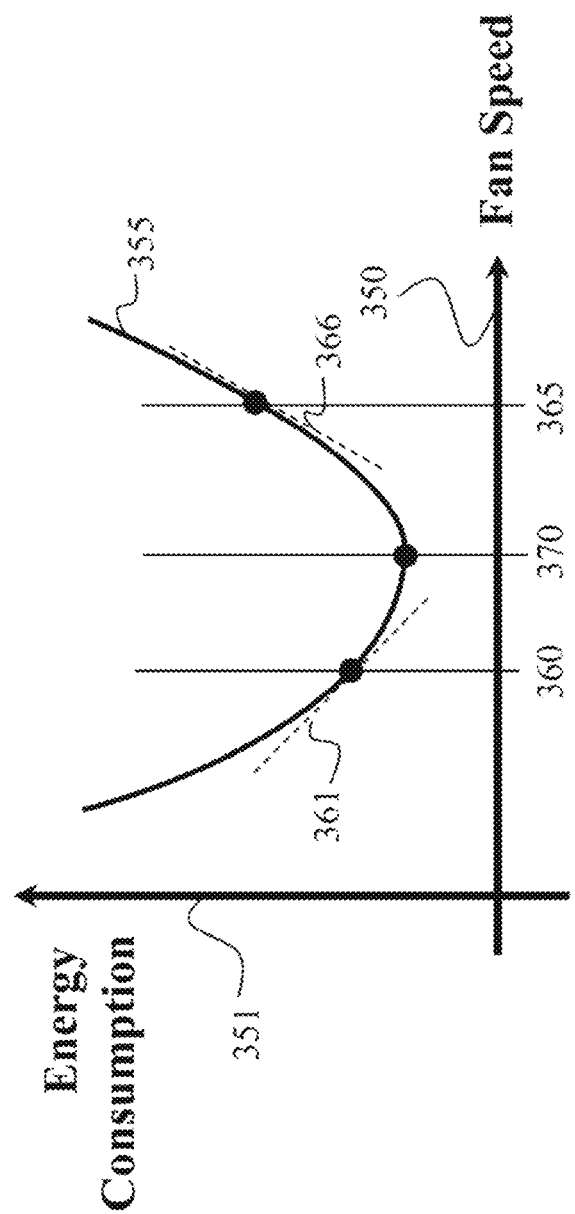
FIG. 3 is a graph of a convex relationship between one actuator in a vapor compression system and a performance metric.

FIG. 3A shows a graph of a convex relationship 355 in the steady state mapping between control signal for controlling one or several actuators of the vapor compression system, such as the indoor unit fan speed 350 and the metric of performance 351. For example, if the metric of performance is the energy consumption of the vapor compression system, the relationship 355 shows that for constant temperatures and heat loads, there exists one set of actuators commands that minimizes energy consumption 370.

The extremum seeking controller estimates the gradient or slope of this mapping and drives actuators in the direction that the overall metric of performance is either maximized or minimized, according to the particular application. For example, if the initial fan speed 365 is greater than the optimal fan speed, the extremum seeking controller estimates the gradient 366 of the relationship between the fan speed and performance metric, and drives the fan speed to smaller values until the optimum 370 is reached.

In some embodiments the parameter representing a relationship between values of the control signal and values of the metric of performance includes a gradient (slope) of the performance metric with respect to the control signal. Some embodiment of the invention are based on a realization that such parameters should not be estimated exactly for each time step of the control, but can be approximated as long as the estimation converges to the true value of the parameter during the transient time of the control.

Such realization allows taking advantage from the iterative nature of the extremum seeking control and to update the parameter recursively and concurrently with the determination of the control signal. For example, the extremum seeking control could be posed as (i) a time-varying estimation of the parameter coupled with (ii) a control law that uses the estimated parameter to steer the control signal. Specifically, a current value of the estimated parameter can be determined based on the previous value of the estimated parameter and an error between the determined value of the metric of performance and a measured value of the metric of performance. In this way, the estimated parameter, e.g., the gradient, is guaranteed to converge to the true gradient regardless of noise. Further, this method does not rely on averaging and therefore converges faster than the perturbation-based schemes commonly used. When this estimated gradient is used in a control law, the control signal is driven to the value that optimizes the performance metric.

Figure 4A:
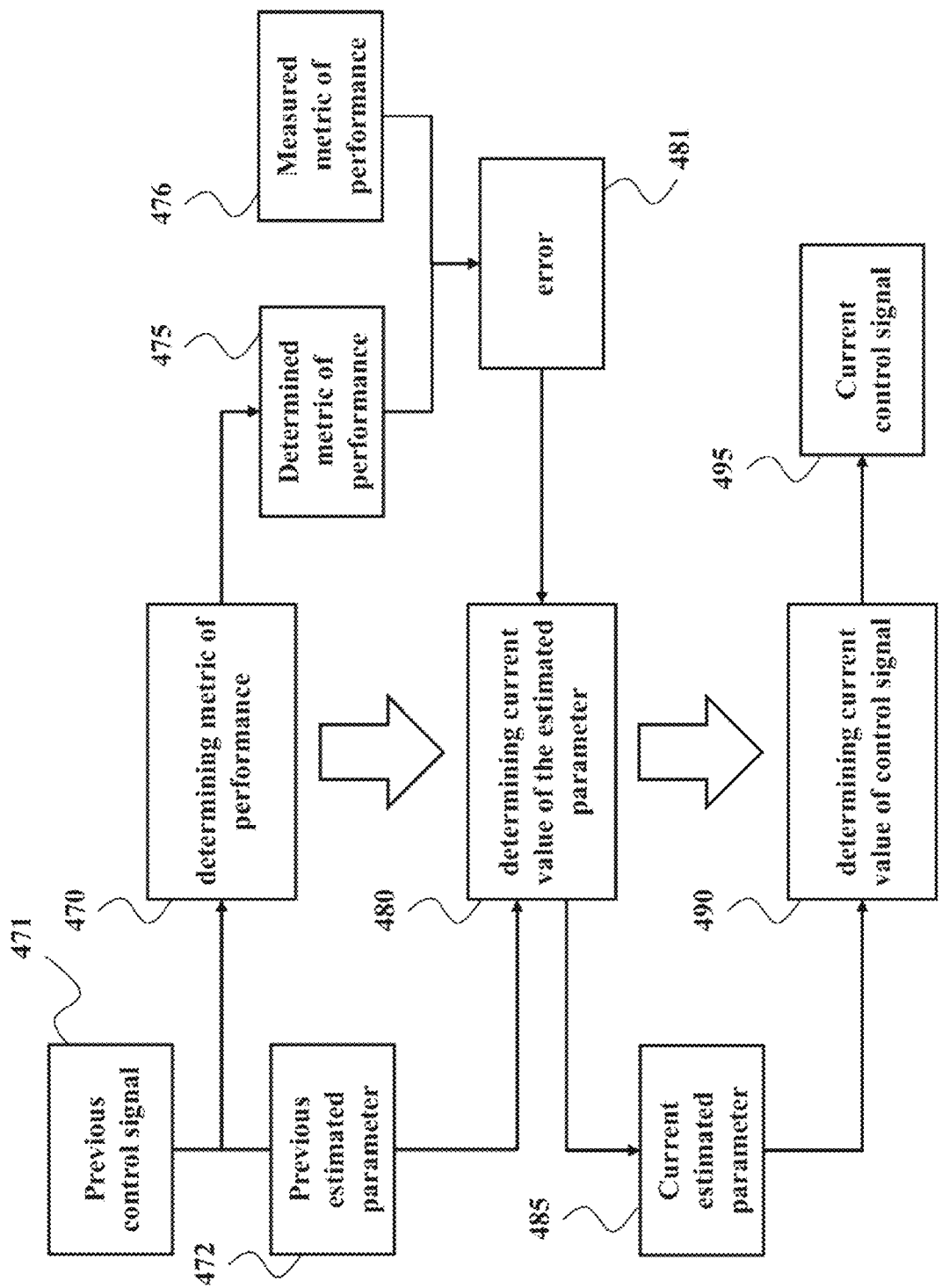
FIG. 4A is a block diagram of a method for controlling a vapor compression system according to some embodiments of the invention.

FIG. 4A shows a block diagram of a method for controlling a vapor compression system according to some embodiments of the invention. The steps of the method can be performed by a processor, e.g., a processor of the controller 400 and include determining 470 at a current time step of a control k, a value 475 of a metric of performance of the vapor compression system using a previous value 472 of an estimated parameter and a previous value 471 of a control signal determined for a previous time step of the control.

The values of the estimated parameter represent a relationship between values of the control signal and values of the metric of performance. In one embodiment, the estimated parameter is an estimation of a gradient of a convex relationship, e.g., the gradient 366 of the convex relationship 355.

In another embodiment commands to multiple actuators are gathered in a vector, and the performance metric is optimized by simultaneously modifying commands to multiple actuators. The estimated parameters in this embodiment then represent a vector of gradients of the convex relationship, where each entry in the vector represents a gradient of the performance metric with respect to a particular actuator. Suitable modifications to the terms in the extremum seeking algorithm are made to ensure the multi-dimensional calculations are conformable.

Various embodiments are based on the recognition that when the estimated output tracks the measured output, the estimated gradient has converged to the true gradient. Accordingly, the method further includes determining 480 a current value 485 of the estimated parameter based on the previous value 475 of the estimated parameter and an error 481 between the determined value 475 of the metric of performance and a measured value 476 of the metric of performance. For example, the current value of the estimated parameter is determined to reduce the error.

Next, the method includes determining 490 a current value 495 of the control signal based on the current value of the estimated parameter 485, such that the metric of performance is optimized, e.g., the energy consumption of the system is reduced.

Figure 4B:
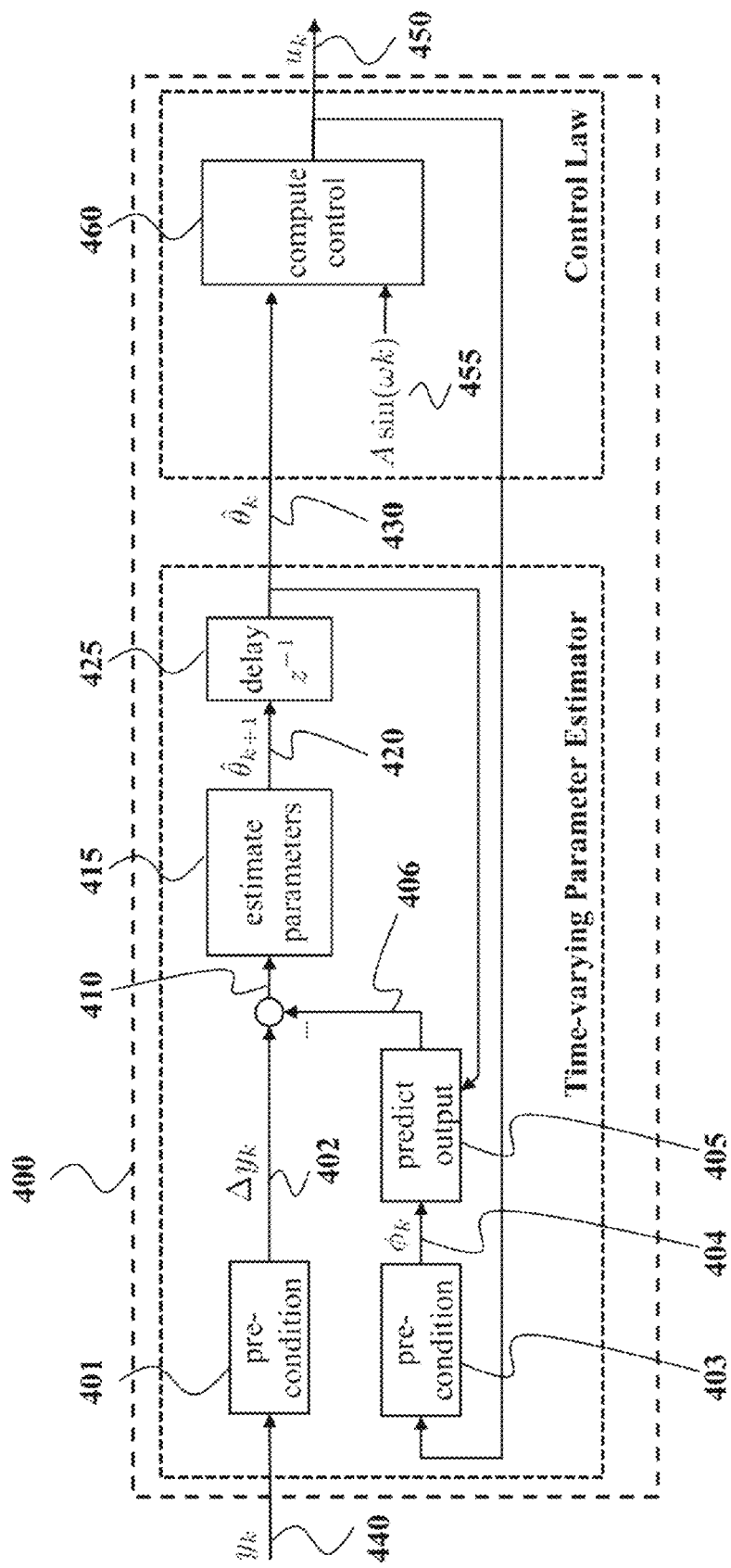
FIG. 4B is block diagram of a time-varying extremum seeking controller according to some embodiments of the invention.

FIG. 4B shows a block diagram of the extremum seeking controller according to one embodiment of the invention. The controller includes a time-varying parameter estimator for determining a parameter representing a relationship between values of the control signal and values of the metric of performance, e.g., the estimated gradient 430, and a control law unit for determining the control signal based on the estimated gradient to improve the metric of the performance.

The controller receives a discrete-time measurement, e.g., from a sensor, or estimate of the performance metric $y_k$ 440. Optionally, the signal representing the performance metric can be preconditioned 401 or refactored. A preconditioning operation can include subtracting the current measurement $y_k$ with the previous measurement $y_{k-1}$ to obtain a change in measurement $\Delta y_k$ 402.

Separately, the control signal $u_k$ 450, e.g., an input applied to the controlled system or a setpoint provided to a feedback controller, can also be preconditioned 403 or refactored depending on the details of the estimation routine. As with the measurement preconditioning, the input preconditioning can include subtracting the current input $u_k$ with the previous input $u_{k-1}$ to obtain a change in input $\Delta u_k = \phi_k$ 404.

Using the change in the input, an estimated change in output is calculated using a prediction 405 operation as follows: The true gradient of the system is assumed to be a time-varying parameter $\theta_k$. The estimated change in output $\Delta \hat{y}_k$ 406 is related to the change in input according to $\Delta \hat{y}_k = \phi_k^T \hat{\theta}_k$, where $\hat{\theta}_k$ represents the estimated gradient.

The remaining components of the time-varying parameter estimator are designed to drive the estimated change in output to the measured change in output by manipulating the estimated gradient. The estimated change in output $\Delta \hat{y}_k$ 406 is subtracted from the measured change in output $\Delta y_k$ 402 in order to obtain an error signal 410. This error signal is used to drive recursive parameter estimation routine 415 and obtain a new estimate of the gradient $\hat{\theta}_{k+1}$ 420 to be used during the next time step.

As the system is driven toward the optimal operating point, the gradient varies in magnitude (and direction in a multivariable version of the embodiments) and this time-varying nature is accounted for in the estimation routine. The recursive parameter estimation routine uses no averaging to obtain an estimate of the gradient. For this reason, convergence to the true gradient proceeds faster than in the perturbation-based extremum seeking method.

In addition to its role in determining an estimated output, the estimated gradient $\hat{\theta}_k$ 430 is also used to compute a control action 460 in the control law component of the extremum seeking controller. Using the estimated gradient, a control law is determined such that the input drives the system toward the optimal point, that is, the point to where the gradient is driven towards zero. Additionally, a sinusoidal perturbation 455 may be added to the input to provide sufficient excitation to the system so that the gradient may be estimated. More detail about the computing a control action 460 is provided below.

In some embodiments, the signals can be vector valued and the coefficients may be scalars, vectors or matrices of suitable dimension to ensure the multi-dimensional calculations are conformable. In this manner, different embodiments can simultaneously optimize a multiplicity of vapor compression system actuators.

Parameter Estimation

Figure 5:
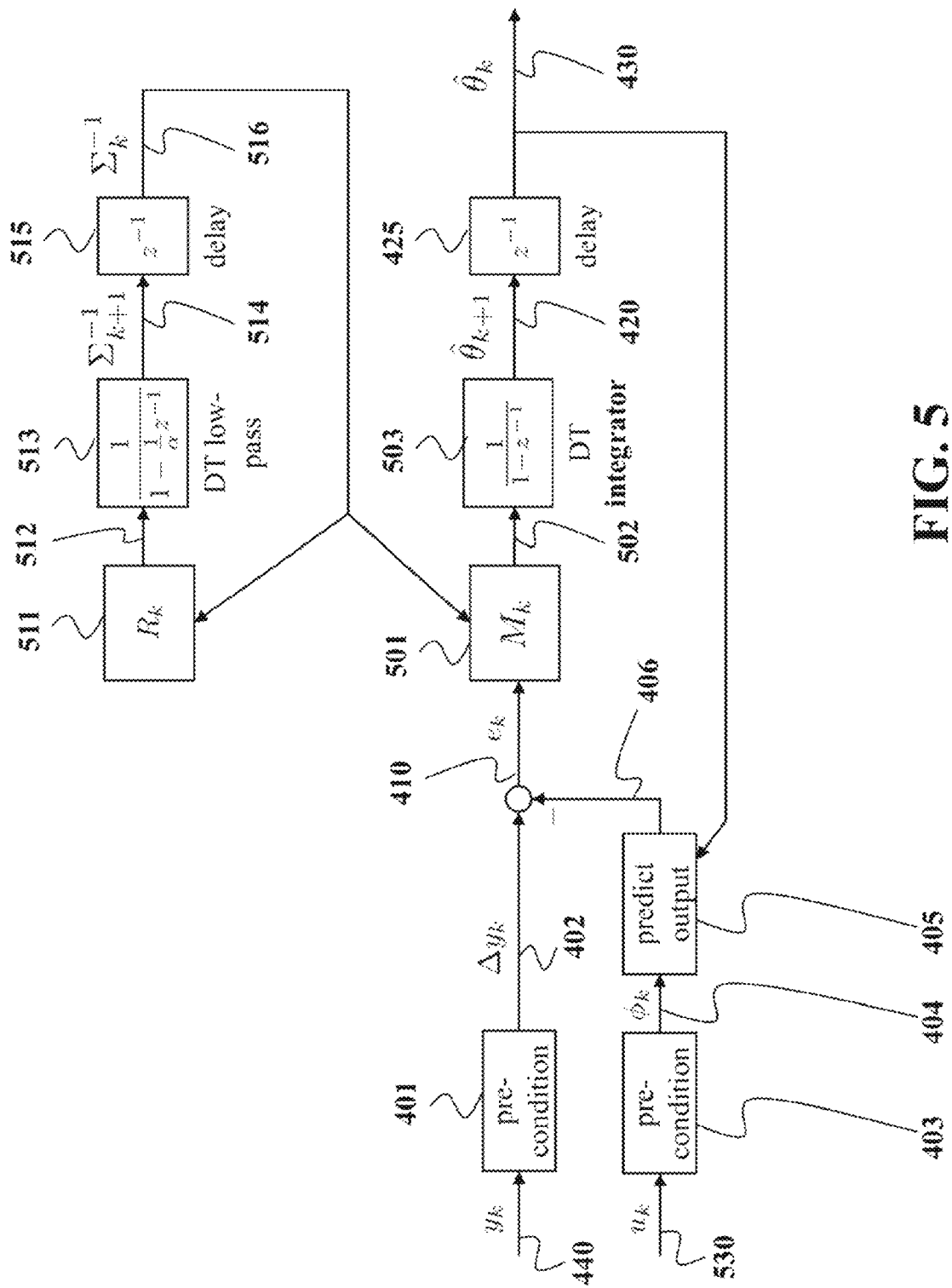
FIG. 5 is a diagram of a method for determining an estimated parameter according to some embodiments of the invention.

FIG. 5 shows a block diagram of a method for recursively updating the estimated parameter, e.g., the gradient 415 according to one embodiment. The objective of the parameter estimator is to obtain an estimate for the gradient $\hat{\theta}_k$ 430 by recursively updating a covariance matrix $\Sigma_k^{-1}$ 516, and using this matrix to (i) update a gain matrix $M_k$ 501 that multiplies the error signal $e_k$ and is integrated over time 503, and (ii) update a gain matrix $R_k$ 511 which is low-pass filtered 513 to obtain an estimate of the covariance matrix at the current time step $\Sigma_{k+1}^{-1}$ 514, which is delayed 515 for use in the next iteration. The value delayed from the previous iteration is available at the output of the delay block $\Sigma_k^{-1}$ 516, which is used to update covariance $\Sigma_k^{-1}$ 516 matrix, and the recursive cycle repeats.

Accordingly, this embodiment recursively updates a covariance matrix based on the control signal, a forgetting factor and a timescale separation parameter, and determines the current value of the estimated parameter based on the previous value of the estimated parameter and the covariance matrix.

In some embodiments, the covariance matrix $\Sigma_k^{-1}$ 516 is a function of a change of the control signal $\phi_k$. The forgetting factor accounts for a change between the previous and the current values of the estimated parameter. Also, the timescale separation parameter ensures that a period for determining the estimated parameter is slower than a dominant time constant of the vapor compression system.

An alternative interpretation of the low-pass filter operation 513 is a discrete-time integrator with a forgetting factor $\alpha$, which allows the parameter estimation method to estimate a time-varying signal. The forgetting factor $\alpha$ is a constant with a value between zero and one. For example, the value of the forgetting factor is selected based on a desired rate of convergence. Values of a forgetting factor $\alpha$ close to one are to be used for systems where the time-varying parameters are expected to change quickly, and conversely, values of a forgetting factor $\alpha$ close to zero are to be used for systems where the time-varying parameters are expected to change slowly.

The gain matrix $M_k$ 501 can be determined according to $$M_k = \frac{\frac{\epsilon}{\alpha}\sum_k^{-1}\phi_k}{1+\frac{1}{\alpha}\phi_k^T\sum_k^{-1}\phi_k}$$

and is updated at each time step based on new values for the covariance matrix $\Sigma_k^{-1}$ and the change in input $\phi_k$, and also using the forgetting factor $\alpha$ and a timescale separation parameter $\epsilon$. When the operations for $M_k$ 501, the discrete-time integrator 503, and a single step delay 425 are expanded into an equation for $\hat{\theta}_{k+1}$ 420, the resulting equation provides the recursive gradient update calculation:

$$\hat{\theta}_{k+1} = \hat{\theta}_k + \frac{\epsilon}{\alpha}\sum_k^{-1}\phi_k\left(1+\frac{1}{\alpha}\phi_k^T\sum_k^{-1}\phi_k\right)^{-1}(e_k)$$

where $e_k$ is the error signal previously described.

The equation for $R_k$ 511 is defined as $$R_k = \frac{\frac{\epsilon}{\alpha^2}\sum_k^{-1}\phi_k^T\phi_k\sum_k^{-1}}{1+\frac{1}{\alpha}\phi_k^T\sum_k^{-1}\phi_k}$$

and, similarly to $M_k$, is updated at each time step based on new values for the covariance matrix $\Sigma_k^{-1}$ and the change in input $\phi_k$, and also using the forgetting factor $\alpha$ and a timescale separation parameter $\epsilon$. When the operations for $R_k$ 511, the discrete-time low-pass filter 513, and a single-step delay 515 are expanded into an equation for $\Sigma_{k+1}^{-1}$ 514, the recursive characteristic of the time-varying estimator becomes apparent:

$$\sum_{k+1}^{-1} = \sum_k^{-1} + \epsilon\left(\frac{1}{\alpha}-1\right)\sum_k^{-1} - \frac{\epsilon}{\alpha^2}\sum_k^{-1}\phi_k\left(1+\frac{1}{\alpha}\phi_k^T\sum_k^{-1}\phi_k\right)^{-1}\phi_k^T\sum_k^{-1}$$

Control Law Calculation

Figure 6:
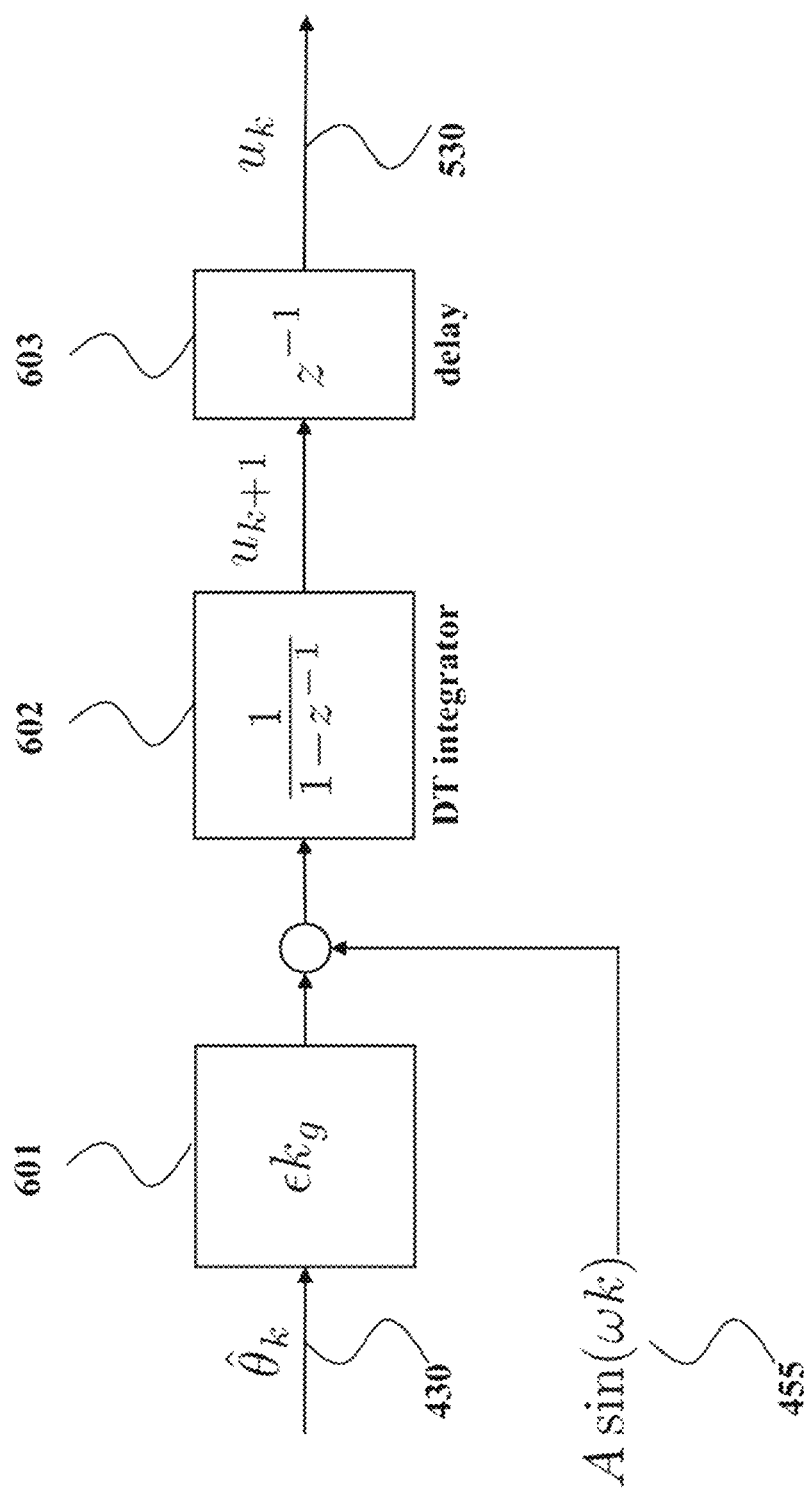
FIG. 6 is a diagram of a method for determining the control signal according to one formulation of the invention.

FIG. 6 shows a block diagram of a method for computing a control action 460. The current value of the estimated parameter, e.g., the estimated gradient $\hat{\theta}_k$ 430, is multiplied by an adaptation gain $k_g$, and the timescale separation parameter $\epsilon$ 601. The result of this operation is added to an optional dither signal 455, which is commonly implemented as a sinusoid. The resulting signal is then passed to a discrete-time integrator 602 to obtain the control value at the next time step $u_{k+1}$, and a single step delay 603 to obtain the input at the current time step $u_k$.

The control law is designed to drive the inputs in a direction that maximizes or minimizes the performance metric, based on the estimated gradient. For example, if the objective is to minimize power consumption, and the estimated gradient at the current time step is positive, e.g., the current fan speed at time step k is at point 365 in FIG. 3, then the current actuator value is larger than the optimal value and its value should be decreased by the controller. For minimization objectives, $k_g$ is selected to be negative, and therefore a negative value is provided to the discrete-time integrator in this example, and the result is that the average value of the control action is decreased over time, as expected.

Accordingly, if the metric of performance is a power consumption of the vapor compression system, then some embodiments select the adaptation gain as a negative number if the current value of the estimated parameter is positive, and select the adaptation gain as a positive number if the current value of the estimated parameter is negative.

One embodiment represents the time-varying extremum seeking controller for vapor compression systems as the following set of discrete-time equations.

The time-varying gradient estimator equations take the form:

$$\Delta \hat{y}_k = \phi_k^T \hat{\theta}_k$$

$$\sum_{k+1}^{-1} = \sum_k^{-1} + \epsilon\left(\frac{1}{\alpha}-1\right)\sum_k^{-1} - \frac{\epsilon}{\alpha^2}\sum_k^{-1}\phi_k\left(1+\frac{1}{\alpha}\phi_k^T\sum_k^{-1}\phi_k\right)^{-1}\phi_k^T\sum_k^{-1}$$

$$\hat{\theta}_{k+1} = \hat{\theta}_k + \frac{\epsilon}{\alpha}\sum_k^{-1}\phi_k\left(1+\frac{1}{\alpha}\phi_k^T\sum_k^{-1}\phi_k\right)^{-1}(e_k)$$

The control law equation is $$u_{k+1} = u_k - \epsilon k_g \hat{\theta}_k + \Sigma d_k.$$

Optionally, a projection operator can be used for the calculation of $\hat{\theta}_{k+1}$, which constrains calculations of $\hat{\theta}_{k+1}$ to lie within a predetermined feasible set of estimated parameters, $\Theta_0$. For example, one may determine a priori that all estimated gradients must be less than some upper bound $L_1$, in which case the feasible set of estimated parameters is $\Theta_0 = \{\hat{\theta}_k | \|\hat{\theta}_k\| \leq L_1\}$. In this case, the equation for $\hat{\theta}_{k+1}$ becomes $$\bar{\theta}_{k+1} = Proj\left[\hat{\theta}_k + \frac{\epsilon}{\alpha}\sum_k^{-1}\phi_k\left(1+\frac{1}{\alpha}\phi_k^T\sum_k^{-1}\phi_k\right)^{-1}(e_k), \Theta_0\right].$$

EXAMPLE

Figure 7A:
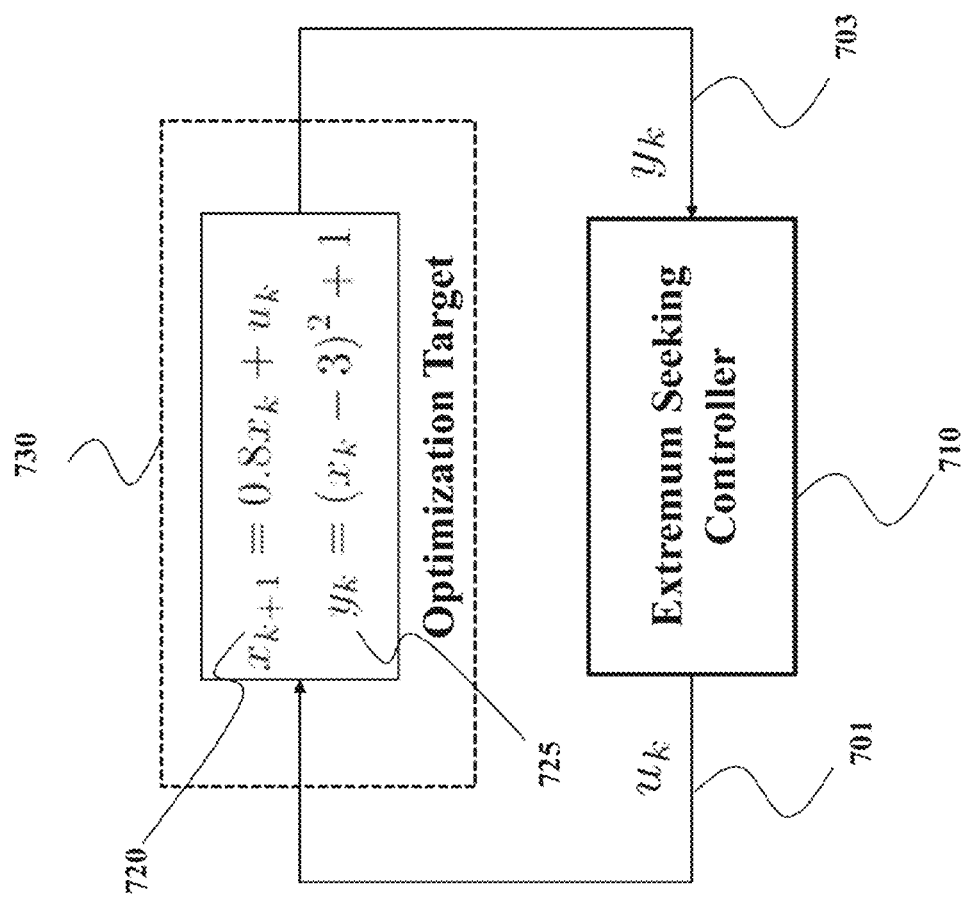
FIG. 7A is a schematic of usage of an extremum seeking method for the problem of minimizing the performance metric.

FIG. 7A shows a schematic of usage of an extremum seeking method for the problem of minimizing the performance metric of a simple Hammerstein system 730 including a first-order linear difference equation 720 and a static output nonlinearity 725. The controller 710 generates control signal 701 provided to the optimization target 730 and receives measurements of the performance metric 703. The controller has no model of the Hammerstein system or any explicit knowledge about the nature of its optimal value, other than the assumption that the relationship between the input and output is convex, and that the optimal value of the performance metric, y 703 is a minimum.

The equations for this system 730 are given by $$x_{k+1}=0.8x_k+u_k$$

$$y_k=(x_k-3)^2+1,$$

which has a single optimum point at $$u^*=0.6$$

$$y^*=1.$$

FIGS. 7B and 7C show graphs representing a comparison of the performance of the controller 710 starting from an initial input value of u=2 and turned ON after 100 steps. The conventional controller selects inputs 740 that drive the system output 750 to its optimum 770 in about 4000 steps (ultimate convergence cannot be shown in the FIG. 7B and FIG. 7C due to the slow rate of the conventional method), while the time-varying ESC of some embodiments selects inputs 745 that drive the system output 755 to its optimum 770 in about 250 steps.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a vapor compression system including a compressor, at least one fan, and an expansion valve for performing a vapor compression cycle of the vapor compression system, including at least one sensor for measuring performance of the vapor compression system, and including a controller having a processor coupled with stored instructions implementing the method, wherein the instructions, when executed by the processor carry out at least some steps of the method, comprising at a current time step of a control:

controlling the vapor compression system according to a value of a control signal at each time step of control, wherein the control signal causes a change in one or combination of speed of the compressor, speed of the fan, and an opening of the expansion valve of the vapor compression system; and measuring, using the sensor, a signal indicative of performance of the vapor compression system controlled according to the control signal for each time step of control, wherein the controlling at a current time step of control comprises:

determining, from a value of the signal at the current time step of control, a measured value of a metric of performance at the current time step of control;

retrieving from a memory a previous value of an estimated parameter determined for a previous time step of the control and a previous value of a control signal determined for the previous time step of the control, wherein values of the estimated parameter represent a relationship between values of the control signal and values of the metric of performance;

determining a value of a metric of performance of the vapor compression system based on the previous value of the estimated parameter and the previous value of a control signal;

determining a current value of the estimated parameter based on the previous value of the estimated parameter and an error between the determined value of the metric of performance and the measured value of the metric of performance, wherein the current value of the estimated parameter is determined to reduce the error;

determining a current value of the control signal based on the current value of the estimated parameter;

storing in the memory the current value of the estimated parameter and current value of the control signal for a subsequent time step of the control; and causing the vapor compression system to operate in accordance with the current value of the control signal.

2. The method of claim 1, wherein the estimated parameter is an estimation of a gradient of a convex relationship between the control signal and the metric of performance of the vapor compression system.

3. The method of claim 1, wherein the estimated parameter is a vector of gradients of a convex relationship between a set of control signals controlling a set of actuators of the vapor compression system and the metric of performance of the vapor compression system.

4. The method of claim 1, wherein the determining the current value of the estimated parameter comprises:

updating recursively a covariance matrix based on the control signal, a forgetting factor and a timescale separation parameter; and determining the current value of the estimated parameter based on the previous value of the estimated parameter and the covariance matrix.

5. The method of claim 4, wherein the covariance matrix is a function of a change of the control signal, wherein the forgetting factor accounts for a change between the previous and the current values of the estimated parameter, and wherein the timescale separation parameter ensures that a period for determining the estimated parameter is slower than a dominant time constant of the vapor compression system.

6. The method of claim 1, wherein the determining the current value of the control signal comprises:
multiplying the current value of the estimated parameter by an adaptation gain and a timescale separation parameter.

7. The method of claim 6, wherein the metric of performance is a power consumption of the vapor compression system, further comprising:
selecting the adaptation gain as a negative number if the current value of the estimated parameter is positive; and
selecting the adaptation gain as a positive number if the current value of the estimated parameter is negative.

8. The method of claim 6, further comprising:
adding a sinusoidal perturbation to the control signal.

9. The method of claim 1, wherein the control signal represents a setpoint provided to a feedback controller.

10. The method of claim 1, wherein the control signal represents a modification to an actuator command.

11. An extremum seeking controller for controlling a vapor compression system including a compressor, at least one fan, and an expansion valve for performing a vapor compression cycle of the vapor compression system, the controller comprising:
at least one processor for controlling the vapor compression system according to a control signal for each time step of control, wherein the control signal causes a change in one or combination of speed of the compressor, speed of the fan, and an opening of the expansion valve of the vapor compression system; and
at least one sensor for measuring a signal indicative of performance of the vapor compression system controlled according to the control signal for each time step of control; and
a memory for storing parameters of the control,
wherein the processor at a current time step of control is configured for:
determining, from a value of the signal at the current time step of control, a measured value of a metric of performance at the current time step of control;
retrieving from the memory a previous value of an estimated parameter determined for a previous time step of the control and a previous value of a control signal determined for the previous time step of the control, wherein values of the estimated parameter represent a relationship between values of the control signal and values of the metric of performance;
determining a value of a metric of performance of the vapor compression system based on the previous value of the estimated parameter and the previous value of a control signal;
determining a current value of the estimated parameter based on the previous value of the estimated parameter and an error between the determined value of the metric of performance and the measured value of the metric of performance, wherein the current value of the estimated parameter is determined to reduce the error;
determining a current value of the control signal based on the current value of the estimated parameter;
storing in the memory the current value of the estimated parameter and current value of the control signal for a subsequent time step of the control; and
causing the vapor compression system to operate in accordance with the current value of the control signal.

12. The controller of claim 11, wherein the estimated parameter is an estimation of a gradient of a convex relationship between the control signal and the metric of performance of the vapor compression system.

13. The controller of claim 11, wherein the estimated parameter is a vector of gradients of a convex relationship between a set of control signals, wherein there is one control signal for an actuator of the vapor compression system and the metric of performance of the vapor compression system.

14. The controller of claim 11, wherein the control signal includes a setpoint provided to a feedback controller of the vapor compression system.

15. The controller of claim 11, wherein the processor is configured for updating recursively a covariance matrix based on the control signal, a forgetting factor and a timescale separation parameter, and configured for determining the current value of the estimated parameter based on the previous value of the estimated parameter and the covariance matrix.

16. The controller of claim 15, wherein the covariance matrix is a function of a change of the control signal, wherein the forgetting factor accounts for a change between the previous and the current values of the estimated parameter, and wherein the timescale separation parameter ensures that a period for determining the estimated parameter is slower than a dominant time constant of the vapor compression system.

17. A vapor compression system, comprising:
an evaporator having a fan for adjusting an air-flow rate through a heat exchanger, wherein the fan is variable speed fan controlled by an evaporator fan control device;
a condenser having a fan for adjusting the air-flow rate through the heat exchanger, wherein the fan is variable speed fan controlled by a condenser fan control device;
a compressor having a speed for compressing and pumping refrigerant through the system, wherein the speed of the compressor is variable and controlled by a compressor control device;
an expansion valve for providing an adjustable pressure drop between a high-pressure portion and a low-pressure portion of the vapor compression system, wherein the expansion valve is controlled by an expansion valve control device; and
the controller of claim 11, wherein the control signal causes a change in one or combination of speed of the compressor, speed of the evaporator fan, speed of the condenser fan and an opening of the expansion valve of the vapor compression system.

* * * * *